United States Patent [19]

Maeda et al.

[11] Patent Number: 5,599,754
[45] Date of Patent: Feb. 4, 1997

[54] GLASS COMPOSITION FOR A SUBSTRATE, AND SUBSTRATE FOR PLASMA DISPLAY MADE THEREOF

[75] Inventors: Kei Maeda; Yasumasa Nakao; Hideki Kushitani; Setsuro Ito, all of Yokohama, Japan

[73] Assignee: Asahi Glass Company Ltd., Tokyo, Japan

[21] Appl. No.: 542,320

[22] Filed: Oct. 12, 1995

[30] Foreign Application Priority Data

Oct. 14, 1994 [JP] Japan .................................. 6-249781

[51] Int. Cl.$^6$ .................................................. C03C 3/087
[52] U.S. Cl. .......................................... 501/70; 501/69
[58] Field of Search ...................................... 501/69, 70

[56] References Cited

U.S. PATENT DOCUMENTS

| | | | |
|---|---|---|---|
| 2,527,693 | 10/1950 | Armistead | 501/57 |
| 3,464,932 | 9/1969 | Connelly et al. | 501/62 |
| 3,627,549 | 12/1971 | La Grouw | 501/70 |
| 3,805,107 | 4/1974 | Boyd | 501/70 |
| 4,015,966 | 4/1977 | Weaver . | |
| 4,337,410 | 6/1982 | Van der Geer et al. | 501/70 |
| 4,830,990 | 5/1989 | Connelly | 501/64 |
| 5,348,916 | 9/1994 | Kushitani et al. | 501/66 |
| 5,489,558 | 2/1996 | Moffatt et al. | 501/69 |
| 5,508,237 | 4/1996 | Moffatt et al. | 501/69 |

FOREIGN PATENT DOCUMENTS

| | | |
|---|---|---|
| 0592237 | 4/1994 | European Pat. Off. . |
| 3-40933 | 2/1993 | Japan . |
| 1191162 | 5/1970 | United Kingdom . |

OTHER PUBLICATIONS

Chemical Abstracts, vol. 115, No. 4, Jul. 29, 1991, JP–A–00 340 933, Feb. 21, 1991.

*Primary Examiner*—Mark L. Bell
*Assistant Examiner*—Louis M. Troilo
*Attorney, Agent, or Firm*—Oblon, Spivak, McClelland, Maier & Neustadt, P.C.

[57] ABSTRACT

A glass composition for a substrate consisting essentially of from 52 to 62 wt % of $SiO_2$, from 5 to 12 wt % of $Al_2O_3$, from 0 to 4 wt % of MgO, from 3 to 5.5 wt % of CaO, from 6 to 9 wt % of SrO, from 0 to 13 wt % of BaO, from 17 to 27 wt % of MgO+CaO+SrO+BaO, from 7 to 14 wt % of $Li_2O+Na_2O+K_2O$, from 0.2 to 6 wt % of $ZrO_2$, and from 0 to 0.6 wt % of $SO_3$.

16 Claims, No Drawings

GLASS COMPOSITION FOR A SUBSTRATE, AND SUBSTRATE FOR PLASMA DISPLAY MADE THEREOF

BACKGROUND OF THE INVENTION

1. Field of the Invention

The present invention relates to a glass composition for a substrate, which is useful as a substrate glass for flat display panels, particularly for plasma display panels (PDP) and which is suitable for production of a large size substrate by a float process.

2. Discussion of Background

PDP is usually prepared by baking metal electrodes, an insulating paste, a rib paste, etc. on a substrate glass at a maximum temperature of from about 550° to 600° C., followed by frit-sealing a facing plate. As a substrate glass for this purpose, it has heretofore been common to employ soda lime silica glass which is widely used in the field of buildings or automobiles.

However, the glass transition temperature of such soda lime silica glass is at a level of from 530° to 550° C. Therefore, if subjected to heat treatment at the above maximum temperature, the substrate undergoes deformation, or the substrate glass undergoes a substantial dimensional change, whereby it has been difficult to precisely align the electrode positions with the facing plate. Such a problem tends to be more distinct when the size of the panel becomes large to a level of e.g. a so-called 40 inch panel, and a substrate glass having higher heat resistance will be required.

Alkali-free glass for liquid crystal, as disclosed in e.g. U.S. Pat. No. 5,348,916, is available as a substrate glass which is presently widely used as glass for display and which is superior in the heat resistance to the soda lime silica glass. However, the thermal expansion coefficient of such glass is within a range of from $35 \times 10^{-7}$ to $50 \times 10^{-7}$ C.$^{-1}$ which is far lower than the thermal expansion coefficient of from $80 \times 10^{-7}$ to $90 \times 10^{-7}$ C.$^{-1}$ of the soda lime silica glass. Therefore, in order to use such alkali-free glass for liquid crystal, for PDP, it will be necessary to properly select various frit-paste materials so that they agree to the thermal expansion coefficient of the substrate glass. However, it is practically very difficult to select them within the above temperature range.

On the other hand, Japanese Unexamined Patent Publication No. 40933/1991 discloses a glass composition which has a thermal expansion coefficient of substantially the same level as the thermal expansion coefficient of the soda lime silica glass and which has a small thermal deformation at 600° C. However, the composition disclosed in this publication is still not fully satisfactory for either one of the following reasons.

(1) The glass transition temperature is lower than 600° C., the shrinkage of the glass by heat treatment is not sufficiently small for a panel as large as a so-called 40 inch panel.

(2) The content of CaO is at least 6 wt %, whereby the devitrification temperature is high, and it is difficult to form a panel excellent in the quality and productivity by a float process.

SUMMARY OF THE INVENTION

It is an object of the present invention to solve the above problems and to provide a glass composition for a substrate, which has a high glass transition temperature so that it is suitable for the production of large size PDP and which is suitable for forming by a float process.

The present invention provides a glass composition for a substrate consisting essentially of from 52 to 62 wt % of $SiO_2$, from 5 to 12 wt % of $Al_2O_3$, from 0 to 4 wt % of MgO, from 3 to 5.5 wt % of CaO, from 6 to 9 wt % of SrO, from 0 to 13 wt % of BaO, from 17 to 27 wt % of MgO+CaO+SrO+BaO, from 7 to 14 wt % of $Li_2O+Na_2O+K_2O$, from 0.2 to 6 wt % of $ZrO_2$, and from 0 to 0.6 wt % of $SO_3$.

DETAILED DESCRIPTION OF THE PREFERRED EMBODIMENTS

Forming by a float process is carried out with a viscosity of about $10^4$ poise. Accordingly, forming by a float process tends to be practically difficult unless the glass to be treated has a devitrification temperature lower than the temperature at which the viscosity is $10^4$ poise.

Now, the reason for the definition of the composition of the glass composition of the present invention will be described.

$SiO_2$ is a component constituting the network of the glass. If its content is less than 52 wt %, the heat resistance of the glass tends to be poor. On the other hand, if its content exceeds 62 wt %, the thermal expansion coefficient tends to be low. $SiO_2$ is preferable within a range of from 54 to 60 wt %.

$Al_2O_3$ is effective for increasing the glass transition temperature and improving the heat resistance. If its content is less than 5 wt %, no such effects will be obtained. On the other hand, if its content exceeds 12 wt %, the thermal expansion coefficient of the glass tends to be too low. $Al_2O_3$ is preferably within a range of from 6 to 11 wt %.

MgO is not an essential component, but it is possible to improve the glass transition temperature and to increase the thermal expansion coefficient by its incorporation. However, if its content exceeds 4 wt %, devitrification is likely to result.

CaO has a function to improve the transition temperature of the glass and to increase the thermal expansion coefficient. If its content is less than 3 wt %, the thermal expansion coefficient of the glass tends to be too small. On the other hand, if its content exceeds 5.5 wt %, the devitrification temperature becomes higher than the forming temperature by a float process, whereby forming by a float process tends to bee difficult.

SrO has a function to increase the transition temperature of the glass and to increase the thermal expansion coefficient, like CaO. If its content is less than 6 wt %, the thermal expansion coefficient of the glass tends to be too small. On the other hand, if its content exceeds 9 wt %, the devitrification temperature becomes higher than the forming temperature by a float process, whereby forming by a float process tends to be difficult.

Like MgO, BaO is not an essential component, but it is possible to improve the transition temperature of the glass and to increase the thermal expansion coefficient by incorporating it. However, if its content exceeds 13 wt %, devitrification is likely to result.

With respect to MgO+CaO+SrO+BaO, if their total amount is less than 17 wt %, the heat resistance of the glass tends to be low, and the thermal expansion coefficient tends to be too small. On the other hand, if the total amount exceeds 27 wt %, the devitrification temperature tends to be too high. MgO+CaO+SrO+BaO is preferably within a range of from 18 to 25 wt %.

With respect to $Li_2O$, $Na_2O$ and $K_2O$, at least one of them is essential to increase the thermal expansion coefficient of the glass. If their total amount is less than 7 wt %, the thermal expansion coefficient of the glass tends to be too small. On the other hand, if the total amount exceeds 14 wt %, the heat resistance of the glass tends to be low. $Li_2O+Na_2O+K_2O$ is preferably within a range of from 8 to 13 wt %.

Among them, $K_2O$ serves to increase the thermal expansion coefficient of the glass and is preferably contained in an amount of at least 4 wt %. On the other hand, if these components are incorporated excessively, the heat resistance of the glass tends to remarkably decrease. From such a viewpoint, $Na_2O$ is preferably from 0 to 6 wt %, $K_2O$ is preferably from 4 to 12 wt %, and $Li_2O$ is preferably from 0 to 1 wt %.

$ZrO_2$ is used to improve the heat resistance and chemical resistance of the glass. If its content is less than 0.2 wt %, the effects of the addition are little. It is preferably incorporated in an amount of at least 0.5 wt %. On the other hand, if its content exceeds 6 wt %, the devitrification temperature of the glass tends to be too high.

$SO_3$ is not an essential component, but it is usually employed as a clarifier. However, if its content exceeds 0.6 wt %, the glass is likely to reboil during the preparation, whereby air bubbles tend to remain in the glass.

Thus, a preferred glass composition of the present invention consists essentially of from 54 to 60 wt % of $SiO_2$, from 6 to 11 wt % of $Al_2O_3$, from 0 to 4 wt % of MgO, from 3 to 5.5 wt % of CaO, from 6 to 9 wt % of SrO, from 0 to 13 wt % of BaO, from 18 to 25 wt % of MgO+CaO+SrO+BaO, from 0 to 1 wt % of $Li_2O$, from 0 to 6 wt % of $Na_2O$, from 4 to 12 wt % of $K_2O$, from 8 to 13 wt % of $Li_2O+Na_2O+K_2O$, from 0.5 to 6 wt % of $ZrO_2$, and from 0 to 0.6 wt % of $SO_3$.

In addition to the above components, the glass composition of the present invention may contain $As_2O_3$, $Sb_2O_3$, $P_2O_5$, F and Cl in a total amount of at most 2 wt % to improve the meltability, the clarity and the forming property of the glass. Further, in order to improve the chemical durability of the glass, $La_2O_3$, $TiO_2$, $SnO_2$ and ZnO may be incorporated in a total amount of at most 5 wt %. Further, coloring agents such as $Fe_2O_3$, CoO, NiO and $Na_2O_3$ may be incorporated to adjust the color of the glass. The total content of such coloring agents is preferably at most 1 wt %.

Further, in order to improve the meltability, $B_2O_3$ may be incorporated. However, its excessive incorporation decreases the thermal expansion coefficient. Accordingly, its content is preferably less than 1.5 wt %.

The glass transition temperature of the glass thus obtained is usually at least 600° C., preferably at least 610° C. Further, the devitrification temperature of the glass obtainable by the present invention is lower than the temperature at which the viscosity if $10^4$ poise. The difference is preferably at least 40° C. Further, the thermal expansion coefficient of the glass obtained by the present invention is within a range of from $75 \times 10^{-7}$ to $95 \times 10^{-7}$/° C., preferably from $80 \times 10^{-7}$ to $90 \times 10^{-7}$/°C.

The glass of the present invention is suitable for a substrate for plasma display, and its spectral transmittance is preferably at least 85% within ranges of from 425 to 475 nm, from 510 to 560 nm and from 600 to 650 nm.

The glass of the present invention can be prepared, for example, by the following method. Namely, raw materials of the respective components which are commonly used, are blended to obtain a desired composition, which is continuously introduced into a melting furnace, and heated and melted at a temperature of from 1,500° to 1,600° C. This molten glass is formed into a sheet having a predetermined thickness by a float process, the sheet is annealed and then cut, and transparent glass substrates are obtained.

Now, the present invention will be described in further detail with reference to Examples. However, it should be understood that the present invention is by no means restricted by such specific Examples.

EXAMPLES 1 TO 10 AND COMPARATIVE EXAMPLES 11 TO 18

Example Nos. 1 to 10 (Table 1) represent working Examples of the present invention, and Example Nos. 11 to 18 (Table 2) represent Comparative Examples.

Raw materials for the respective components were mixed to have the desired composition and heated and melted at a temperature of 1,600° C. for 4 hours by means of a platinum crucible. During the melting, a platinum stirrer was used for stirring for 2 hours to homogenize the glass. Then, the molten glass was cast and formed into a sheet, followed by annealing.

With respect to the glass thus obtained, the composition (the upper parts in Tables 1 and 2, unit: wt %), the thermal expansion coefficient, the glass transition temperature, the viscosity temperature and the devitrification temperature were measured, and the results are shown in Tables 1 and 2. The thermal expansion coefficient is shown in the line for "α" with a unit of $10^{-7}$ C.$^{-1}$. The glass transition temperature is shown in the line for "Tg" with a unit of °C. The devitrification temperature is shown in the line for "C" with a unit of °C. With respect to the viscosity temperature, the temperature at which the viscosity is $10^2$ poise, is shown in the line for "A" with a unit of °C., and the temperature at which the viscosity is $10^4$ poise, is shown in the line for "B" with a unit of °C.

The glass transition temperature was determined as follows. The glass was maintained at an annealing temperature for 30 minutes and then cooled at a rate of 60° C./min for annealing. Then, with respect to this annealed glass, a curve of the thermal expansion rate from room temperature to the yield point was obtained by using a differential thermal expansion meter. Tangential lines were drawn before and after the first yield point of this curve, and the temperature corresponding to the intersection of the tangential lines, was taken as the glass transition temperature.

As is evident from Table 1, the thermal expansion coefficients of the glass compositions of the present invention are within a range of from $80 \times 10^{-7}$ to $90 \times 10^{-7}$ C.$^{-1}$ which is equal to the range of conventional soda lime silica glass. The glass transition temperatures are all at least 610° C., which indicates that there is no such a problem that the glass undergoes shrinkage during the preparation of large size PDP. Further, the devitrification temperatures are lower by at least 40° C. than the temperatures corresponding to $10^4$ poise which is the viscosity for forming by a float process, which indicates that the glass compositions of the present invention are suitable for the preparation of large size panels by a float process.

On the other hand, Table 2 shows, as Comparative Examples, the results of measurements carried out in the same manner with respect to glass compositions disclosed in Japanese Unexamined Patent Publication No. 40933/1991. Among the Comparative Examples, the glass compositions of Example Nos. 13 and 14 have glass transition temperatures lower than 600° C., which indicates that the heat resistance is inadequate and there will be a problem of glass shrinkage during the preparation of large size PDP.

The glass compositions of Example Nos. 11, 12 and 15 to 18 have devitrification temperatures higher than the temperatures corresponding to $10^4$ poise, which indicates that the devitrification is likely to result during the forming by a float process.

TABLE 1

| Example No. | 1 | 2 | 3 | 4 | 5 | 6 | 7 | 8 | 9 | 10 |
|---|---|---|---|---|---|---|---|---|---|---|
| $SiO_2$ | 59.4 | 54.1 | 57.0 | 54.1 | 56.5 | 57.7 | 55.3 | 56.0 | 60.1 | 58.1 |
| $Al_2O_3$ | 7.1 | 6.5 | 8.3 | 10.7 | 8.3 | 6.9 | 7.7 | 8.2 | 7.2 | 6.8 |
| MgO | 3.2 | 0.8 | 1.4 | 1.9 | 1.9 | 2.0 | 2.0 | 1.9 | 3.1 | 0.0 |
| CaO | 5.2 | 4.7 | 5.0 | 4.6 | 3.4 | 5.0 | 5.0 | 5.3 | 5.2 | 5.3 |
| SrO | 7.2 | 6.6 | 7.0 | 6.5 | 8.4 | 7.0 | 6.5 | 6.9 | 8.8 | 7.6 |
| BaO | 3.6 | 12.7 | 11.2 | 9.5 | 7.9 | 8.0 | 8.9 | 7.8 | 0.0 | 8.9 |
| $Li_2O$ | 0.0 | 0.0 | 0.6 | 0.0 | 0.0 | 0.0 | 0.0 | 0.0 | 0.0 | 0.0 |
| $Na_2O$ | 3.5 | 4.9 | 3.4 | 4.0 | 4.2 | 4.3 | 2.4 | 4.2 | 4.5 | 4.2 |
| $K_2O$ | 7.6 | 4.3 | 4.6 | 8.0 | 5.9 | 6.0 | 9.6 | 6.5 | 7.7 | 5.9 |
| $ZrO_2$ | 3.1 | 5.3 | 1.2 | 0.5 | 3.0 | 3.0 | 2.5 | 3.0 | 3.2 | 3.0 |
| $SO_3$ | 0.1 | 0.1 | 0.3 | 0.2 | 0.5 | 0.1 | 0.1 | 0.2 | 0.2 | 0.2 |
| α | 82 | 82 | 82 | 86 | 82 | 83 | 87 | 80 | 84 | 83 |
| Tg | 644 | 635 | 613 | 625 | 638 | 631 | 635 | 635 | 638 | 624 |
| A | 1554 | 1480 | 1515 | 1545 | 1564 | 1521 | 1540 | 1535 | 1548 | 1529 |
| B | 1197 | 1155 | 1142 | 1156 | 1186 | 1166 | 1180 | 1175 | 1188 | 1154 |
| C | 1140 | 1115 | 1090 | 1110 | 1120 | 1090 | 1080 | 1100 | 1145 | 1110 |

TABLE 2

| Example No. | 11 | 12 | 13 | 14 | 15 | 16 | 17 | 18 |
|---|---|---|---|---|---|---|---|---|
| $SiO_2$ | 56.0 | 60.0 | 64.0 | 55.0 | 58.0 | 58.0 | 56.0 | 60.2 |
| $Al_2O_3$ | 10.0 | 8.0 | 5.0 | 13.0 | 7.0 | 10.0 | 14.0 | 8.0 |
| MgO | 2.0 | 2.0 | 0.0 | 2.0 | 2.0 | 4.0 | 6.0 | 0.0 |
| CaO | 10.0 | 10.0 | 9.0 | 9.0 | 11.0 | 9.0 | 6.0 | 10.0 |
| SrO | 0.0 | 2.0 | 5.0 | 0.0 | 0.0 | 3.8 | 0.0 | 3.0 |
| BaO | 8.0 | 8.0 | 4.0 | 6.0 | 9.0 | 3.0 | 5.7 | 6.6 |
| $Li_2O$ | 0.0 | 0.5 | 0.0 | 2.0 | 0.0 | 0.0 | 0.0 | 0.0 |
| $Na_2O$ | 3.0 | 2.0 | 10.0 | 8.0 | 3.0 | 4.0 | 8.0 | 6.0 |
| $K_2O$ | 6.7 | 5.2 | 1.0 | 0.0 | 6.0 | 6.0 | 3.0 | 4.0 |
| $ZrO_2$ | 2.0 | 2.0 | 1.8 | 5.0 | 3.0 | 2.0 | 1.0 | 2.0 |
| $SO_3$ | 0.0 | 0.0 | 0.2 | 0.0 | 0.0 | 0.2 | 0.0 | 0.2 |
| $As_2O_3$ | 0.3 | 0.0 | 0.0 | 0.0 | 0.0 | 0.0 | 0.3 | 0.0 |
| $Sb_2O_3$ | 0.0 | 0.3 | 0.0 | 0.0 | 0.0 | 0.0 | 0.0 | 0.0 |
| $SnO_2$ | 0.5 | 0.0 | 0.0 | 0.0 | 0.5 | 0.0 | 0.0 | 0.0 |
| $TiO_2$ | 1.5 | 0.0 | 0.0 | 0.0 | 0.5 | 0.0 | 0.0 | 0.0 |
| α | 83 | 75 | 87 | 79 | 78 | 78 | 81 | 82 |
| Tg | 657 | 650 | 576 | 585 | 655 | 671 | 649 | 626 |
| A | 1521 | 1533 | 1430 | 1422 | 1487 | 1550 | 1589 | 1503 |
| B | 1199 | 1194 | 1073 | 1122 | 1183 | 1217 | 1220 | 1145 |
| C | 1200 | 1210 | 1060 | 1100 | 1190 | 1220 | 1225 | 1150 |

The glass composition of the present invention is suitable for forming by a float process and has a high glass transition temperature and a thermal expansion coefficient equal to that of soda lime silica glass, whereby it is useful for applications where such properties are required, e.g. as substrates for plasma display.

What is claimed is:

1. A glass composition consisting essentially of from 52 to 62 wt % of $SiO_2$, from 5 to 12 wt % of $Al_2O_3$, from 0 to 4 wt % of MgO, from 3 to 5.5 wt % of CaO, from 6 to 9 wt % of SrO, from 0 to 13 wt % of BaO, from 17 to 27 wt % of MgO+CaO+SrO+BaO, from 7 to 14 wt % of $Li_2O+Na_2O+K_2O$, from 0.2 to 6 wt % of $ZrO_2$, and from 0 to 0.6 wt % of $SO_3$, wherein the glass composition has a glass transition temperature of at least 600° C. and a devitrification temperature lower than the temperature at which the viscosity is $10^4$ poise.

2. The glass composition according to claim 1, which has a thermal expansion coefficient of from $75 \times 10^{-7}$ to $95 \times 10^{-7}$/°C.

3. The glass composition according to claim 1, which consists essentially of from 54 to 60 wt % of $SiO_2$, from 6 to 11 wt % of $Al_2O_3$, from 0 to 4 wt % of MgO, from 3 to 5.5 wt % of CaO, from 6 to 9 wt % of SrO, from 0 to 13 wt % of BaO, from 18 to 25 wt % of MgO+CaO+SrO+BaO, from 0 to 1 wt % of $Li_2O$, from 0 to 6 wt % of $Na_2O$, from 4 to 12 wt % of $K_2O$, from 8 to 13 wt % of $Li_2O+Na_2O+K_2O$, from 0.5 to 6 wt % of $ZrO_2$, and from 0 to 0.6 wt % of $SO_3$.

4. The glass composition according to claim 3, which has a glass transition temperature of at least 610° C.

5. The glass composition according to claim 3, which has a devitrification temperature lower by at least 40° C. than the temperature at which the viscosity is $10^4$ poise.

6. The glass composition according to claim 3, which has a thermal expansion coefficient of from $80\times10^{-7}$ to $90\times10^{-7}/°C$.

7. A substrate for plasma display, comprising a glass composition consisting essentially of from 52 to 62 wt % of $SiO_2$, from 5 to 12 wt % of $Al_2O_3$, from 0 to 4 wt % of MgO, from 3 to 5.5 wt % of CaO, from 6 to 9 wt % of SrO, from 0 to 13 wt % of BaO, from 17 to 27 wt % of MgO+CaO+SrO+BaO, from 7 to 14 wt % of $Li_2O+Na_2O+K_2O$, from 0.2 to 6 wt % of $ZrO_2$, and from 0 to 0.6 wt % of $SO_3$, wherein the glass composition has a glass transition temperature of at least 600° C. and a devitrification temperature lower than the temperature at which the viscosity is $10^4$ poise.

8. A substrate for plasma display, comprising a glass composition consisting essentially of from 54 to 60 wt % of $SiO_2$, from 6 to 11 wt % of $Al_2O_3$, from 0 to 4 wt % of MgO, from 3 to 5.5 wt % of CaO, from 6 to 9 wt % of SrO, from 0 to 13 wt % of BaO, from 18 to 25 wt % of MgO+CaO+SrO+BaO, from 0 to 1 wt % of $Li_2O$, from 0 to 6 wt % of $Na_2O$, from 4 to 12 wt % of $K_2O$, from 8 to 13 wt % of $Li_2O+Na_2O+K_2O$, from 0.5 to 6 wt % of $ZrO_2$, and from 0 to 0.6 wt % of $SO_3$, wherein the glass composition has a glass transition temperature of at least 600° C., and a devitrification temperature lower than the temperature at which the viscosity is $10^4$ poise.

9. The glass composition of claim 1, comprising 6.5 to 10.7 wt % of $Al_2O_3$.

10. The glass composition of claim 1, comprising from 3.4 to 5.3 wt % of CaO.

11. The glass composition of claim 1, comprising 6.5 to 8.8 wt % of SrO.

12. The glass composition of claim 1, comprising 0 to 0.6 wt % of $Li_2O$.

13. The glass composition of claim 1, comprising 2.4 to 4.9 wt % of $Na_2$.

14. The glass composition of claim 1, comprising 4.3 to 9.6 wt % of $K_2O$.

15. The glass composition of claim 1, comprising 0.1 to 0.5 wt % of $SO_3$.

16. The glass composition of claim 1, comprising 6.5 to 10.7 wt % of $Al_2O_3$, 3.4 to 5.3 wt % of CaO, 6.5 to 8.8 wt % of SrO, 0 to 0.6 wt % $Li_2O$, 2.4 to 4.9 wt % of $Na_2O$, 4.3 to 9.6 wt % $K_2O$, and 0.1 to 0.5 wt % of $SO_3$.

* * * * *